United States Patent [19]
Hitzelberger

[11] 3,853,357
[45] Dec. 10, 1974

[54] VEHICLE PILOT PRESSURE CONTROLLED BRAKE SYSTEM WITH WHEEL LOCK CONTROL MODULATING MEANS

[75] Inventor: Alan L. Hitzelberger, Grand Blanc, Mich.

[73] Assignee: General Motors Corporation, Detroit, Mich.

[22] Filed: Sept. 4, 1973

[21] Appl. No.: 393,734

[52] U.S. Cl. .............. 303/21 F, 188/181 A, 303/7, 303/21 BE
[51] Int. Cl. ............................................... B60t 8/12
[58] Field of Search .......... 188/181, 3 R; 303/7, 20, 303/21, 29, 40

[56] References Cited
UNITED STATES PATENTS

| | | | |
|---|---|---|---|
| 3,017,145 | 1/1962 | Yarber | 303/21 P |
| 3,286,734 | 11/1966 | Hartshorne | 303/21 FX |
| 3,467,444 | 9/1969 | Leiber | 303/21 BE |
| 3,620,577 | 11/1971 | Neisch et al. | 303/7 X |
| 3,709,567 | 1/1973 | Van Ostrom et al. | 303/21 BE |
| 3,717,385 | 2/1973 | Michellone et al. | 303/21 F |
| 3,731,980 | 5/1973 | Fink et al. | 303/21 F |

Primary Examiner—George E. A. Halvosa
Assistant Examiner—Stephen G. Kunin
Attorney, Agent, or Firm—D. D. McGraw

[57] ABSTRACT

An air brake system of the type used in some trucks includes an air compressor, suitable wet and service tanks, a brake application valve controlled by the brake pedal and actuated by the vehicle operator, and a relay valve receiving pilot pressures from the brake application valve and controlling the admission and release of air pressure from the service tank to the brake chambers at the brakes of the wheels to be braked. The rate of brake release and the rate of brake application are controlled by a valve arrangement which in turn is energized and deenergized in accordance with the needs of the vehicle brake system in order to prevent wheel lock. Under normal conditions of braking operation, the vehicle operator controls the brakes by actuating a brake application valve, which generates the pilot pressure, which in turn controls the action of a relay valve, which in turn admits the necessary amount of air pressure to the vehicle brake actuating chambers to operate the vehicle brakes, and releases the air pressure from those brake chambers when the brakes are released, all in accordance with the pilot pressure supplied to the relay valve. The application of pilot pressures to the relay valve is controlled independently of the brake application valve when wheel lock control signals are being generated to prevent wheel lock, so long as the vehicle operator maintains the brake application valve in a position to brake the vehicle.

4 Claims, 3 Drawing Figures

VEHICLE PILOT PRESSURE CONTROLLED BRAKE SYSTEM WITH WHEEL LOCK CONTROL MODULATING MEANS

The invention relates to a fluid operated and controlled brake system for vehicles, and more particularly to air brake systems of the type used in trucks. It is a feature of the invention that the rate of brake release and the rate of brake application are controlled by a valve arrangement which in turn is energized and deenergized in accordance with the needs of the vehicle brake system in order to prevent wheel lock. In providing for modulation of the system, wheel condition sensing sensors are provided and connected to a suitable electronic logic control which generates wheel lock control signals to be used by other portions of the system.

Under normal conditions of braking operation, the vehicle operator controls the brakes by actuating a brake application valve, which generates the pilot pressure, which in turn controls the action of a relay valve, which in turn admits the necessary amount of air pressure to the vehicle brake actuating chambers to operate the vehicle brakes, and releases the air pressure from those brake chambers when the brakes are released, all in accordance with the pilot pressure supplied to the relay valve.

The mechanism embodying the invention includes provision for controlling the application of pilot pressures to the relay valve independently of the brake application valve, so long as the vehicle operator maintains the brake application valve in a position to brake the vehicle. An apply flow control valve is provided in parallel flow relation to a normally open solenoid valve through which the pilot pressure normally passes in an unrestricted manner from the brake application valve to the relay valve. The apply flow control valve is connected to receive pilot pressures from the brake application valve so that the pilot pressures flow therethrough to a three-way solenoid valve. When this solenoid valve is in the released, or deenergized, position, it connects the outlet of the apply flow control valve to the relay valve so that pilot pressures flow therethrough in parallel relation to the normally open solenoid valve. The three-way solenoid valve is also connected to atmosphere through a release flow control valve. In normal brake operating conditions the three-way solenoid valve is not energized, and the connection from that valve to the release flow control valve is closed. Once the initial signal is received from the wheel lock control sensing and signal-generating mechanism, the normally open solenoid valve is closed and remains closed until there is no longer a need to release and reapply the brakes to control wheel lock. At the same time, the three-way solenoid valve is energized so as to disconnect the apply flow control valve from the pilot pressure side of the relay valve, therefore effectively preventing the supply of pilot pressure to the relay valve. Also at the same time the pilot pressure side of the relay valve is connected through the three-way solenoid valve to the release flow control valve and thence to atmosphere, thus providing a decrease in pilot pressure at the relay valve at a controlled rate.

When the electronic control senses sufficient wheel acceleration so that the brake pressure no longer need be released, the three-way solenoid valve is deenergized, and pilot pressures are then provided from the brake application valve through the apply flow control valve and three-way solenoid valve to the relay valve. The apply flow control valve meters the increase in pilot pressure so that the brakes are applied smoothly. If insipient wheel lock again occurs, the electronic control again energizes the three-way solenoid valve and the pilot pressure is again released in a metered manner, as described before. The system will continue to cycle in this manner until there is no longer the need for brake apply and release. After a sufficient interval of time, the normally open solenoid valve will then be deenergized so that the pilot pressures can again pass directly from the brake application valve to the relay valve.

IN THE DRAWINGS

Figure 1:
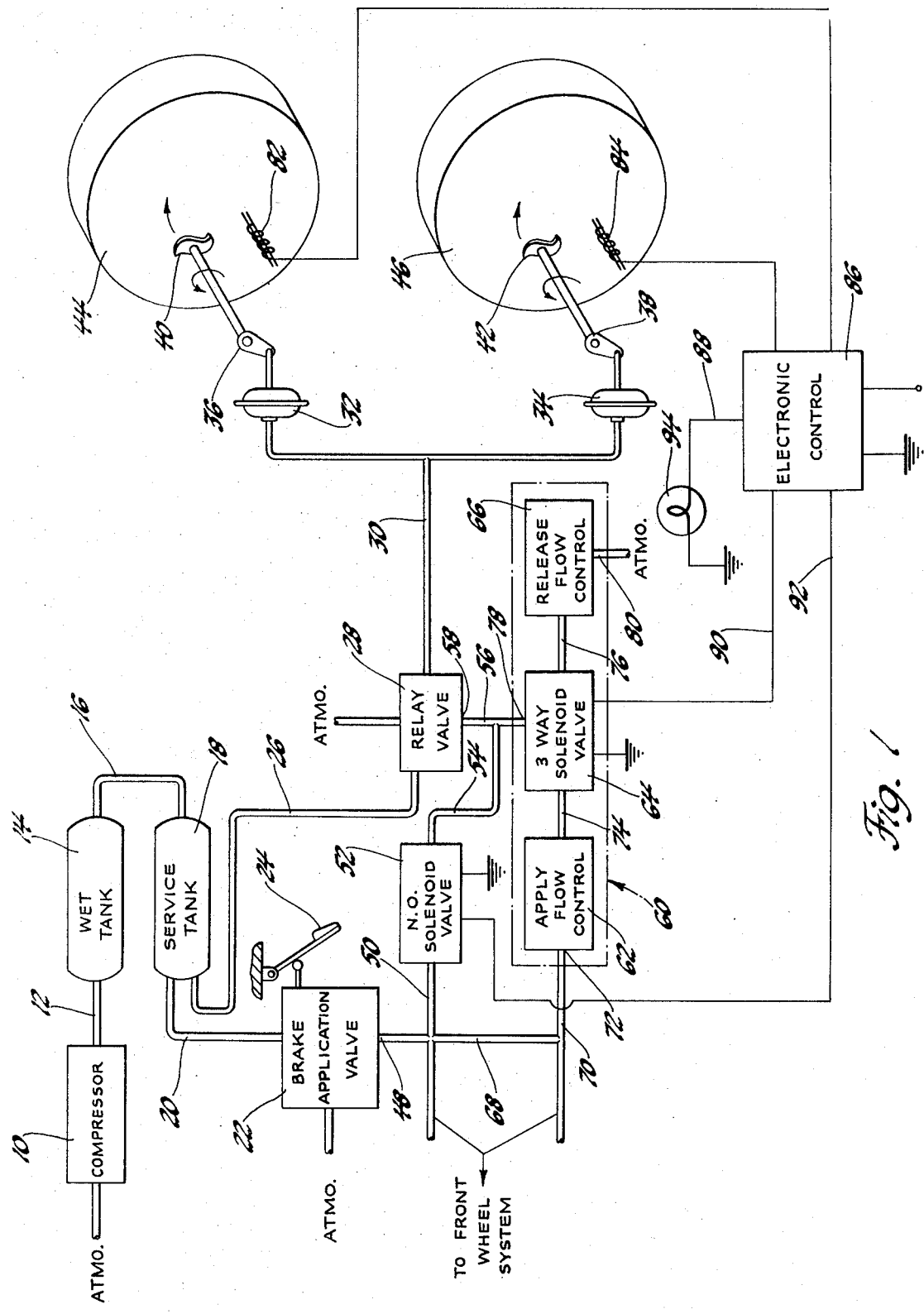
FIG. 1 is a simplified schematic representation of an air brake system for a vehicle, schematically illustrating the system with the various mechanisms embodying the invention.

The schematic illustration shown in FIG. 1 is a simplification of a truck air brake system embodying the invention. The brake system includes an air compressor 10 where the air is compressed to about eight atmospheres and discharged through conduit 12 into the wet tank 14 where moisture is condensed out as the air cools. The dry high pressure air then passes through conduit 16 to the service tank 18. Conduit 20 connects the service tank to the brake application valve 22 so that high pressure air is available to that valve, the valve being controlled by the driver's foot acting on the brake pedal 24. Conduit 26 connects the high pressure air in the service tank 18 to the relay valve 28, which controls the application of the high pressure air to the brakes. The conduit 30 is connected to the high pressure air outlet of the relay valve 28 and conducts the air, under control of the relay valve, to the brake chambers 32 and 34. These chambers actuate linkages 36 and 38, respectively, to actuate the brakes 40 and 42 in order to brake the vehicle wheels 44 and 46.

The outlet 48 of the brake application valve is connected by conduit 50 to a normally open solenoid valve 52. The other end of conduit 50 may lead to the vehicle front wheel brake system, for example, assuming the wheels 44 and 46 are mounted on a rear axle of the vehicle. The outlet of solenoid valve 52 is connected by conduit 54 to conduit 56 and then to the pilot pressure side 58 of the relay valve 28. The relay valve 28 is of the type which is in common usage at the present time on commercial trucks. It has a main metering valve which is opened in accordance with the pilot pressure exerted on the pilot pressure side 58, so that large volumes of pressurized air may flow from the service tank 18 through conduit 26 and conduit 30 to the brake chambers 32 and 34. When the brake apply pressure equals that of the pilot or signal pressure, the main valve in the relay closes and holds the brake chamber pressure at a value equal to the pilot pressure. An increase or a reduction of the pilot pressure causes the brake chamber pressure to rise or fall accordingly, thus increasing or reducing the amount of braking torque available to stop the vehicle. This is a standard type of air pressure brake system currently being devised on truck vehicles except for the provision of the normally open solenoid valve 52.

Figures 2, 3:
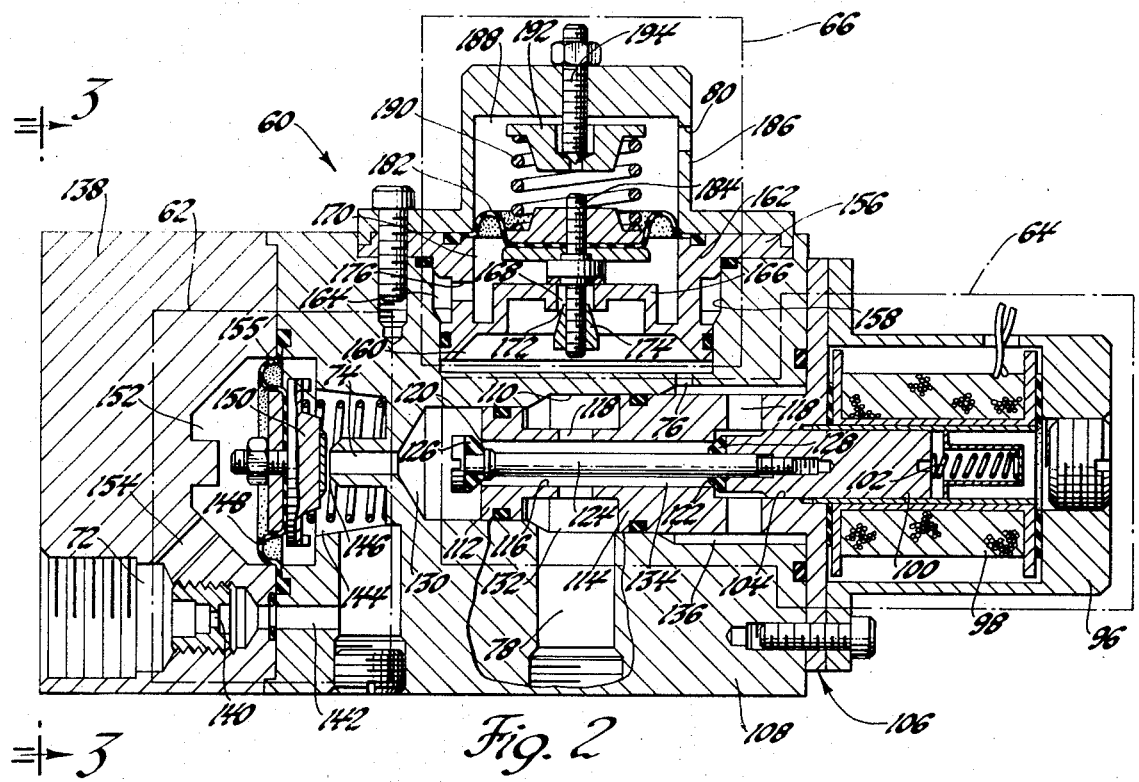
FIG. 2 is a cross section view of the apply flow control, the three-way solenoid valve, and the release flow control of the mechanism schematically shown in FIG. 1. The solenoid valve is shown in the deenergized position.
FIG. 3 is a view of a portion of the valve mechanism of FIG. 2, with parts broken away and in section, and taken in the direction of arrows 3—3 of that figure.

A valve assembly 60, which is shown in three sections in FIG. 1 and is shown in cross section in FIG. 2, comprises an apply flow control section 62, a three-way solenoid valve section 64, and a release flow control valve section 66. The brake application valve outlet 48 is connected by conduit 68 to conduit 70, which in turn is connected to port 72 of the apply flow control section 62. Conduit 70 also extends in the other direction so as to be connected to a portion of the front wheel system. The apply flow control section 62 is connected by passage 74 to one side of the three-way solenoid valve section 64. The other side of the three-way solenoid valve section 64 is connected by port 76 to the release flow control section 66. The center portion of the three-way solenoid valve section 64 has an outlet 78 which is connected to conduit 56 and therefore to the pilot pressure side 58 of the relay valve 28. The release flow control section 66 is provided with an atmospheric vent 80. The internal structural details of the three sections of valve assembly 60 will be described in conjunction with FIGS. 2 and 3.

The wheels 44 and 46 are schematically illustrated in FIG. 1 as being provided with sensors 82 and 84 which sense changes in the wheel characteristics during braking. These sensors may be of any suitable type such as is well known in the art. They normally sense changes in wheel acceleration and deceleration so as to sense insipient wheel lock, therefore generating signals through suitable circuitry which are used to prevent wheel lock from occurring. The sensors are illustrated as being electrically connected to the electronic control 86, which is the logic control for the wheel lock system. This type of control is disclosed and claimed in U.S. Pat. No. 3,709,567 issued Jan. 9, 1973 and entitled ADAPTIVE CONTROL ANTI-LOCK BRAKE SYSTEM and assigned to the common assignee.

The electronic control has three outputs 88, 90 and 92. Output 88 is connected to a failure indicator light 94 which is energized to indicate to the vehicle operator that the electronic control 86 is not working properly, when such is the case. The above-noted patent discloses this type of circuit. Output 90 is connected to the three-way solenoid valve section 64 of valve assembly 60. Output 92 is connected to the normally open solenoid valve 52. Output 92 is in a portion of the control which includes an initial cycle circuit. This circuit drops out on the first cycle of a wheel lock control stop and remains out during the stop. It is reset by the absence of release signals through output 90 plus a short time delay. The initial cycle circuit provides the correct logic for turning on the transistor driver needed to energize the normally open solenoid valve 52. However, the initial cycle circuit has an intentional delay that prevents drop-out until after the first wheel lock control release. Thus the solenoid in the normally open valve is energized on the first release signal and is maintained in its energized condition during the stop by the initial cycle circuit in a manner above described. Details of this type of circuit are disclosed in the above-noted patent.

When the electronic control 86 senses that the wheels 44 and 46 are approaching a wheel lock condition, it energizes the normally open solenoid valve 52, thus blocking the air pressure path through conduits 50 and 54 from the brake application valve 22 to the pilot pressure side 58 of the relay valve 28. At the same time, another electrical signal is sent through electronic control outlet 90 to the three-way solenoid valve section 64, energizing the three-way solenoid valve and creating a fluid connection between the pilot pressure side 58 of the relay valve 28 and the release flow control section 66 so that the pilot pressure is relieved to the atmosphere through vent 80. In this condition the pilot pressure is metered at a controlled rate of pressure decrease due to action of the release flow control section. A reduction in pilot pressure at the relay valve 28 causes a reduction in brake chamber pressure and therefore a reduction in brake apply force and consequently the brake torque will decrease in a manner comparable to the reduction in pilot pressure. As the brake torque is decreased, the wheels 44 and 46 begin to accelerate, the sensors 82 and 84 sense this acceleration, and the information is delivered by them to the electronic control 86. At the proper time in the cycle, the electronic control sends a signal through outlet 90 to deenergize the three-way solenoid valve section 64. However, the normally open solenoid valve remains closed because it remains energized. In this condition, high pressure air from the brake application valve 22 is allowed to flow through the apply flow control section 62 to the pilot pressure side 58 of relay valve 28 at a controlled rate due to the metering action of the apply flow control section, assuming that the vehicle operator has kept the pedal 24 depressed. Again, the brake-actuating pressure in conduit 30 and brake chambers 32 and 34 will follow the increase in pilot pressure at the relay valve, causing an increase in brake torque and a deceleration of the wheels 44 and 46. If the wheels again approach an insipient wheel lock condition, the cycle is repeated.

At the completion of a stop, or the completion of a cycling operation, the normally open solenoid valve 52 will be deenergized after the appropriate time delay, thus allowing a normal connection between the brake application valve 22 and the relay valve pilot pressure side 58. All normal braking is carried out through the normally open solenoid valve.

Looking more specifically at FIGS. 2 and 3 of the drawings, the three blocks schematically shown in FIG. 1 as the three sections of the valve assembly 60 are outlined by dashed lines. When the three-way solenoid valve section is deenergized, it is in the position shown in FIG. 2. The three-way solenoid valve section includes a case 96 containing the coil 98 and the armature 100 forming the solenoid portion of the section. The armature is urged leftwardly as seen in FIG. 2 by compression spring 102. The armature extends into a bore 104 formed in the valve seat body 106. This body is fastened to and extends into housing 108, a bore 110 being provided in housing 108 for this purpose. The portion of the valve seat body 106 extending into bore 110 is formed with spaced lands 112 and 114, each of which carries an O-ring seal sealing the land to the wall of bore 110. A bore 116 extends through the valve seat body 106 in the area adjacent the lands 112 and 114 and joins bore 104. A cross passage 118 extends through the valve seat body 106 adjacent the point where bores 104 and 116 are joined. Another cross passage 118 is formed in the body 106 so as to intersect bore 116 intermediate lands 112 and 114. The opposite ends of bore 116 are formed to provide valve seats 120 and 122, respectively. A valve pin 124 is secured to armature 100 and extends through bore 116 in radially spaced relation thereto. A valve 126 is provided on the outer end of the valve pin 124 and a valve 128 is provided adjacent the end of armature 100 and the inner end of valve pin 124. Valve 126 cooperates with valve seat 120 and valve 128 cooperates with valve seat 122. In the deenergized condition shown, spring 102 positions valve 128 against its seat 122 while valve 126 is spaced from its seat 120.

The left end of bore 110, in cooperation with valve 126 and the end of the valve seat body 106, defines a chamber 130. The space between lands 112 and 114 and within bore 110 defines a chamber 132. The cross passage 118 connects chamber 132 and the annular chamber 134, which is defined by bore 116, valve pin 124, and valves 126 and 128. The right end of bore 110 defines an annular chamber 136 which is connected with cross passage 118. Port 76, leading to the release flow control section 66, is connected with chamber 136. Passage 74, which connects the apply flow control section 62 to the three-way solenoid valve section 64, communicates with chamber 130. The outlet port 78, which leads to the pilot pressure side 58 of the relay valve 28, connects with chamber 132.

The apply flow control section 62 has a cover 138 which is fastened to the housing 108. Inlet port 72 is formed in the cover and an apply orifice 140 connects the inlet port 72 with passage 142, which leads to chamber 144. The port 74 connects with chamber 144 through valve seat 146, which is formed at the left end of port 74. Chamber 144 is on one side of a diaphragm 148 which mounts the flow control valve 150. This valve is positioned to cooperate with valve seat 146 as the diaphragm moves in its stroke. The other side of diaphragm 148 from chamber 144 is formed as a chamber 152. This chamber is connected to inlet port 72 by passage 154. Compression spring 155 urges valve 150 away from its seat 146.

The release flow control section 66 has a valve seat body 156 formed to extend into a recess 158 of housing 108 so as to define a chamber 160 between the seat body 156 and the base of the recess. Port 76 connects chamber 136 of the three-way solenoid valve section 64 with chamber 160, passing through the base of the recess 158. The wall 162 of valve seat body 156 is provided with an annular recess to define a chamber 164 between the valve seat body and the side wall of recess 158. The valve seat body 156 has a web section 166 which defines the upper side of chamber 160. The center of the web is provided with a passage 168, connecting chamber 160 with a chamber 170 on the other side of the web. A valve seat 172 is formed on the end of passage 168 which opens into chamber 160. A conically shaped release flow control valve 174 extends into passage 168 and cooperates with valve seat 172 to control flow of fluid from chamber 160 to chamber 170 through passage 168. A port 176 through a side wall 162 of the valve seat body connects chambers 164 and 170. As seen in FIG. 3, a passage 178 through a portion of the housing 108 communicates with the atmosphere through the vent orifice 180.

The upper side of chamber 170 is defined by a diaphragm 182 to which valve 174 is connected by the threaded valve rod 184. A cover 186 holds the diaphragm in position and also defines the atmospheric chamber 188 located above diaphragm 182. Vent 80 connects atmospheric chamber 188 with the atmosphere without any restriction. A compression spring 190 is positioned in chamber 188 so that it acts against the diaphragm 182 and urges valve 174 away from its valve seat 172. The upper end of spring 190 seats on a movable spring seat 192 which is positioned by adjuster 194. Thus the rate of release flow can be adjusted by adjusting the preload on spring 190 through adjustor 194.

When the pilot pressure air from the brake application valve 22 enters the apply flow control port 72, it passes through the apply orifice 140 and passage 142 into chamber 144. Since this pilot pressure is higher than atmospheric pressure, it acts against the diaphragm 148 to move the valve 150 away from its port 74. However, since it must flow through orifice 140 it will not increase at as fast a rate in chamber 144 as it will in chamber 152 since the pilot pressure has relatively unrestricted access to chamber 152 through passage 154. The action of the pressure in chamber 152 on diaphragm 148 is to tend to close valve 150 against its seat 146. The pilot pressure passes through port 74 and into chamber 130. In the normal brake apply position, valve 126 is open and therefore the pressure passes through chamber 134, cross passage 118, and chamber 132 and into the outlet port 78. Thus it is also connected to the pilot pressure side 58 of the relay valve 28.

When the electronic control 86 has signalled the normally open solenoid valve 52 to close, and that action has been taken, the only way that the pilot pressure can travel from the brake application valve 22 to the relay valve 28 is through the apply control valve and the three-way solenoid valve. In this condition the pilot air pressure passes through the apply orifice 140, taking a pressure drop and then pressurizing chamber 144 but at a lower rate than that of chamber 152. The pressures in both chambers act on the diaphragm 148. However, the pressure in chamber 144 is lower than the pressure in chamber 152 due to the pressure drop across orifice 140 so the diaphragm will move to the right and close off port 74. The biased spring 155 adds enough force to the diaphragm assembly to prevent the closure of port 74 at differential pressures less than approximately 5 psi. The operation of this combination of parts results in a substantially constant pressure drop across orifice 140 with fairly constant mass flow characteristics at pressure levels occurring with severe braking. For example, there will be less than 10 percent variation in mass flow for upstream pressure in the range of 80 to 100 psi. The remainder of the available pressure drop between chambers 144 and 130 takes place across the variable area controlled by valve 150 in its relationship with its seat 146. As the pressure in chamber 130 rises, the change in relative pressure between the chambers 144 and 130 decreases, requiring more area at port 74, or diaphragm motion to the left.

The increase in air pressure in chamber 130 of the three-way solenoid valve causes flow at a rate determined by the apply flow control section to pass valve seat 120 and ultimately into outlet port 78 and thence to the pilot pressure side 58 of the relay valve. The controlled flow rate into the small and relative fixed volume of the relay valve pilot pressure chamber causes a rise in the relay pilot pressure which is substantially linear with time. The relay valve then reproduces this pressure with large volumes of air from the service tank 18 through conduits 26 and 30 for use by the brake chambers 32 and 34 to apply the brakes in a linear manner. When the electronic control 86 again signals an insipient wheel lock condition, it sends an energizing signal through its outlet 90 to the coil 98 of the three-way solenoid valve section, moving the armature 100 and the valve connected therewith to the right, as viewed in FIG. 2, resulting in a closure of valve seat 120 by its valve 126 and an opening of valve seat 122 by its valve 128. This connects outlet port 78 and chamber 132 to chamber 136 through cross passage 118, chamber 134, and valve seat 122. At the same time any further flow of pilot pressure air from chamber 130 to outlet port 78 is blocked by closure of valve 126. In this condition, all the chambers and ports in the apply flow control section 62 from inlet port 72 through chamber 130 come to the same pressure that exists at the inlet port. With the connection of chamber 132 to chamber 160 through chamber 136 and port 176, the release flow control section is armed. The pressure in chamber 160 begins to increase and air flow passes through valve seat 172 and passage 168 into chamber 170 due to the fact that spring 190 holds the diaphragm and valve assembly in the down or open position. Air will continue to flow from the relay valve pilot chamber through this circuit until the pressure in chamber 170 is approximately 5 psi above atmospheric pressure. At this time the pressure force upward equals the downward force of spring 190 and the diaphragm 182 is ready to move upwardly and move the tapered valve 174 with it toward its seat 172. The seating action of valve 174 will reduce the flow into chamber 170 and attempt to hold the chamber pressure at approximately 5 psi. However, this chamber is vented to atmosphere through restrictive orifice 180 and will begin to suffer a reduction in pressure and therefore a reduction in the force acting upward on the diaphragm 182. This reduction will permit spring 190 to push the tapered valve 174 slightly away from its seat 172, therefore allowing more air to enter chamber 170 and holding it at approximately 5 psi. This regulating action will therefore cause a substantially constant pressure drop across orifice 180 resulting in a substantially constant mass flow. The constant mass flow is coming from the relay valve pilot pressure chamber and results in a substantially linear pressure drop in that chamber. This reduction may go down to approximately 8 psi, which is the maximum pressure required to overcome the brake return spring in the typical installation. This linear reduction of the relay valve pilot pressure will result in a linear reduction of brake apply pressure by action of the relay metering valve, with the resultant linear reduction of brake torque. As the brake torque is reduced, the wheels 44 and 46 will begin to accelerate and electronic control 86 will signal for reapplication of the brakes by deenergizing the solenoid coil 98. Spring 102 will push the armature 100 to the left, closing valve 128 against its seat 122 and opening valve 126 from its seat 120. This will again allow air from the apply flow control section to enter chamber 130 and proceed to the outlet port 78. In this position, chambers 136, 160 and 170 will come to atmospheric pressure due to the bleed orifice 180.

This arrangement has an inherent surge apply and surge release characteristic. The surge effect helps to overcome time delays caused by solenoids and valve dynamics. It occurs because of the state of the two flow controls prior to switching of the three-way solenoid valve. When the release flow control section is activated, the three-way solenoid valve being energized, the flow surges through the passages and chambers because they are at atmospheric pressure. This causes an initial step reduction in the pilot pressure and a sudden reduction of the brake chamber pressure. Conversely, when the three-way solenoid valve is deenergized in the apply mode, flow will surge into the relay valve pilot pressure chamber because chamber 130 is at application valve pressure through port 72. This causes a rapid increase in the pilot pressure and a sudden increase in the chamber pressure.

What is claimed is:

1. In a fluid pressure actuated brake system for a vehicle, said system having:

a fluid pressure source, brake means for wheels of the vehicle selectively actuated and released by fluid pressure from said source, brake application valve means receiving fluid pressure from said source and controlled by the vehicle operator to generate pilot pressures in accordance with the amount of braking desired, relay valve means receiving said pilot pressures and connecting the pressure source and the brake means and controlling the application and release of fluid pressures to and from the brake means in accordance with the pilot pressures received, and wheel acceleration and deceleration sensing and signal generating means sensing brake effectiveness and specifically incipient wheel lock, said sensing and generating means generating wheel lock control signals accordingly, the improvement comprising:

a normally open valve fluidly intermediate said brake application valve means and said relay valve means to transmit pilot pressures therebetween, first means receiving signals from said sensing and generating means and closing said normally open valve when the signals indicate incipient wheel lock, an apply flow control valve and a three-way valve connected in fluid series relationship and in parallel fluid relationship with said normally open valve, said three-way valve being also connected to exhaust, and second means receiving signals from said sensing and generating means and acting on said three-way valve closing the fluid connection between said apply flow control valve and said relay valve means concurrently with the initial closing of said normally open valve, and also opening a fluid connection through said three-way valve from said relay valve means to exhaust to cause the pilot pressure acting on said relay valve to decrease independently of said brake application valve means, said second receiving means receiving further signals from said sensing and generating means upon sufficient wheel acceleration and acting to reverse the action of said three-way valve so that said relay valve means receive pilot pressures through said apply flow control valve which controls the rate of pilot pressure increase to the pilot pressure generated by the brake application valve means to increase the fluid pressure to the brake means accordingly, the action of said second receiving means on said three-way valve being repeated as signals again indicate incipient wheel lock.

2. The improved system of claim 1 in which a release flow control valve is connected between said three-way valve and exhaust and acts to meter the rate of release of pilot pressure from said relay valve means when the relay valve means is connected to exhaust through said three-way valve.

3. A vehicle wheel lock control system for a vehicle air brake system operated by a relay valve in accordance with pilot air pressures provided thereto from a vehicle operator controlled brake application valve, said system comprising:

a sensor and logic control signal generator having a first signal outlet energized upon an initial brake release signal being generated and remaining energized until there is a predetermined time delay during which no further brake release signals are generated, and a second signal outlet energized only while the initial and subsequent brake release signals are being generated, said second signal outlet being deenergized otherwise;

first valve means fluidly intermediate said brake application valve and said relay valve and responsive to energization of said first signal outlet to interrupt the connection of pilot pressures therethrough;

and second valve means continuously fluidly connected to receive pilot pressures from said brake application valve independently of said first valve means and fluidly connected to said relay valve and fluidly connected to exhaust, said second valve means being responsive to energization of said second signal outlet to release to exhaust at a metered rate the pilot pressure at said relay valve to decrease the air pressure supplied to the vehicle brakes at a metered rate, and further responsive to deenergization of said second signal outlet to bypass said first valve means and deliver pilot pressure from said brake application valve to said relay valve at a metered rate of increase to increase the air pressure supplied to the vehicle brakes at a metered rate.

4. An air pilot pressure control system for a vehicle air pressure controlled and powered brake system including a source of air pressure, vehicle operator controlled means generating an air pilot pressure in accordance with the braking effort desired, a relay valve receiving said pilot pressure and admitting and releasing power air pressire to and from the vehicle brakes in accordance with the pilot pressures received, said control system comprising:

a first normally open solenoid valve fluidly connecting said vehicle operator controlled means and said relay valve so that pilot pressure normally passes therethrough, a flow control valve and a second normally open solenoid valve connected in series, and fluidly connecting said vehicle operator controlled means and said relay valve to provide a flow path for pilot pressure therebetween which is parallel to the flow path through said first normally open solenoid valve, a release control valve controlling pressure decrease therethrough at a metered rate, a third normally closed solenoid valve when open fluidly connecting said relay valve to exhaust through said release control valve, and signal control means responsive to predetermined braking conditions to energize said first normally open solenoid valve to close it and hold it closed, solenoid valves to close said second and open said third solenoid valves, and cyclically deenergize and energize said second and third solenoid valves to cause the vehicle brakes to be applied and released until the predetermined brake conditions cease to exist, and thereafter to deenergize said first normally open solenoid valve, whereby during the cyclic energization and deenergization of said second and third solenoid valves the pilot pressure at said relay valve decreases and increases at metered rates respectively controlled by said release control valve and said flow control valve.

* * * * *